No. 697,335. Patented Apr. 8, 1902.
I. B. HAGAN.
MEASURING INSTRUMENT.
(Application filed Aug. 15, 1901.)
(No Model.)
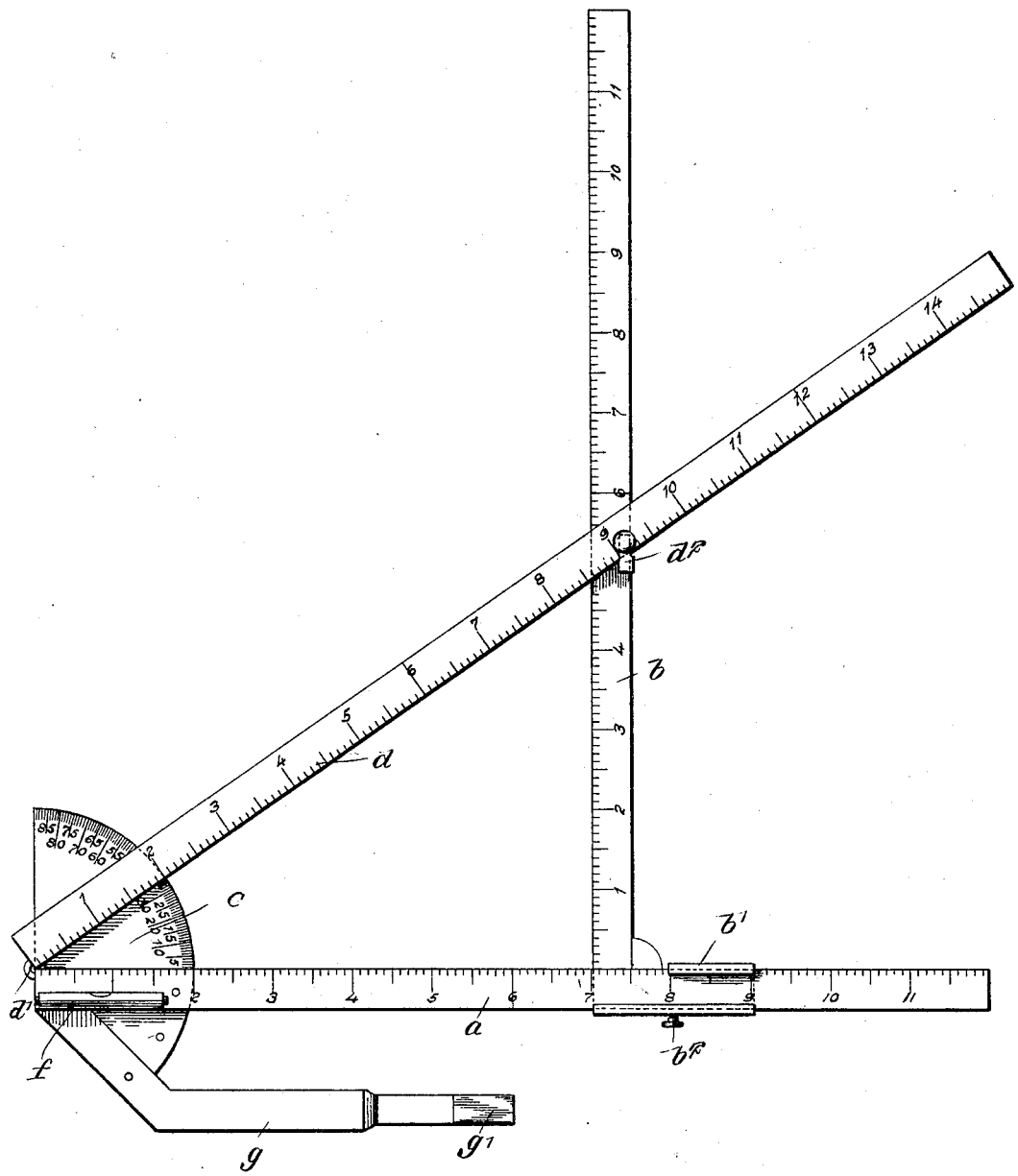
WITNESSES:
INVENTOR
Ira B. Hagan
BY
ATTORNEYS

UNITED STATES PATENT OFFICE.

IRA B. HAGAN, OF NORTH LAMOINE, MAINE, ASSIGNOR OF THREE-FIFTHS TO FREDERICK W. HAGAN AND COLEMAN HAGAN, OF NORTH LAMOINE, IRA B. HAGAN, JR., OF ELLSWORTH FALLS, CHARLES D. PAGE, OF BANGOR, AND PERCY M. MARSH AND LEWELLYN F. CRANE, OF ORONO, MAINE.

MEASURING INSTRUMENT.

SPECIFICATION forming part of Letters Patent No. 697,335, dated April 8, 1902.

Application filed August 15, 1901. Serial No. 72,127. (No model.)

*To all whom it may concern:*

Be it known that I, IRA B. HAGAN, a citizen of the United States, and a resident of North Lamoine, in the county of Hancock and State of Maine, have invented a new and Improved Measuring Instrument, of which the following is a full, clear, and exact description.

This invention relates to an instrument useful in describing and measuring angles and any of their branches, as will be apparent to persons skilled in the art. It comprises certain novel features of construction and arrangement of parts, as will be hereinafter specified.

Reference is to be had to the accompanying drawing, forming a part of this invention, in which the figure represents a side view of the invention.

The instrument comprises a base-rule $a$, graduated in any preferred scale. On this base-rule is mounted a slide $b'$, carrying the perpendicular rule $b$, a set-screw $b^2$ being provided to hold the perpendicular rule in the desired position.

$c$ indicates a protractor-plate which is fastened to the left-hand end of the base-rule $a$, and $d$ indicates the angle-rule, which is pivoted at the point $d'$, such point being coincident with the center of the arc described by the outer edge of the protractor-plate $c$. The angle-rule $d$ is arranged to move along the perpendicular rule $b$, and a clasp $d^3$ is provided to hold the parts $b$ and $d$ rigidly together in the desired adjustment. All the rules $a$, $b$, and $d$ are graduated on corresponding scales, which may be made to represent any units desired.

$f$ indicates a spirit-level, and $g$ indicates an arm, which is attached rigidly to the protractor-plate $c$ and to the base-rule $a$, adjacent to the protractor-plate. This arm has a reduced end $g'$ extending parallel with the base-rule $a$ and adapted to be connected with a staff for supporting the instrument with its base-rule vertical, so that distant points may be located and surveyed along the rule $d$ for the purpose of measurement or otherwise.

The instrument may be used with or without the supporting-staff, as desired, some classes of work requiring a supporting-staff and others not requiring it. By adjusting the rules $b$ and $d$ with respect to the rule $a$ and the protractor $c$ various measurements may be secured, such as the measurement of distances and the laying out of materials for building and other purposes.

Since the use of the instrument as indicated in the statement of invention will be apparent to persons skilled in the art, I will not enter into a detailed description thereof.

Various changes in the form, proportions, and minor details of my invention may be resorted to without departing from the spirit and scope of my invention. Hence I consider myself entitled to all such variations as may lie within the scope of my claim.

Having thus described my invention, I claim as new and desire to secure by Letters Patent—

A measuring instrument, comprising a base-rule, a protractor-plate having at the inner end thereof a spirit-level carried longitudinally of the base-rule, a perpendicular rule, the lower end of which is slidably mounted on the base-rule, an angle-rule pivotally mounted on the inner end of the base-rule and movable over the protractor-plate, and an arm fastened rigidly to the protractor-plate and projecting outward from the base-rule and thence parallel therewith, for the purpose specified.

In testimony whereof I have signed my name to this specification in the presence of two subscribing witnesses.

IRA B. HAGAN.

Witnesses:
ANDREW P. JORDAN,
OWEN BYRN.